United States Patent Office 3,334,133

Patented Aug. 1, 1967

3,334,133

PROCESS FOR PREPARING ALKALI METAL SULFO-N-ALKYLPROPIONAMIDES WHEREIN POLYMER FORMATION IS MINIMIZED

Thomas Frederick McGrath, Selinsgrove, Pa., assignor to American Cyanamid Company, Stamford, Conn., a corporation of Maine No Drawing. Filed Mar. 16, 1964, Ser. No. 352,365
4 Claims. (Cl. 260—513)

The present invention relates to alkali metal sulfo-N-alkylpropionamides prepared by sulfonating N-alkacrylamides produced by the Ritter reaction.

Compounds similar to those prepared by the process of the present invention have been known heretofore, as also their use as dispersing, lathering, or wetting agents particularly in the treatment of textiles. Such compounds, which are described in U.S. Patent No. 2,009,346, are described therein as amido sulfonic acids and are referred to herein as straight chain alkali metal sulfo-N-alkylpropionamides. While it might be assumed that the straight chain propionamides would be similar to the compounds prepared by the process of this invention which compounds are described herein as either branched chain alkali metal sulfo-N-alkylpropionamides, there are, in fact, very marked and surprising differences between them. Thus, the branched chain propionamides prepared by the process of this invention are characterized by excellent surface active properties, including surprisingly good solubility in water, excellent foaming and emulsion stability as compared with the straight chain propionamides.

The branched chain N-alkylacrylamides employed in accordance with the present invention are prepared by employing the procedure described in the Ritter patent, No. 2,573,673, i.e., by causing a suitable α-unsaturated nitrile, for example, acrylonitrile, and a suitable olefin to react in the presence of a cationoid substance such as, for example, concentrated sulfuric acid, and then hydrolyzing the intermediate reaction product to the amide. Reactions of this general type are known and are generally referred to as Ritter reactions, and the products formed therefrom as Ritter reaction products. These products are then converted to alkali metal sulfo-N-alkyl-propionamides by neutralizing the reaction mixture and sulfonating the same with alkali metal sulfite or bisulfite.

The Ritter reaction products of the type contemplated for sulfonation in accordance with the present invention are isomeric mixtures and are generally obtained when long chain olefins derived from petroleum sources are used in the Ritter reaction. It may thus be understood that the particular composition of N-alkylacrylamide isomers obtained will depend upon reaction conditions, principally during the Ritter reaction. Thus, for example, if the olefin and the cationoid substance are allowed to stand at elevated temperatures prior to the addition of the α-unsaturated nitrile, the double bond of the olefin will migrate and the extent of this migration will increase with time. Accordingly, it will be appreciated that the order and time of addition of the reactants in and during the Ritter reaction will influence the distribution of isomers in the final branched chain N-alkylacrylamide. Because of the distribution of isomers in the branched chain N-alklacrylamides, the sulfonation products thereof, that is, the branched chain alkali metal sulfo-N-alkylpropionamides are, in turn, a mixture of various isomers. It is believed that the unusual and unexpected properties of the alkali metal sulfo-N-alkylpropionamides are directly related to the fact that such a number of isomers is obtained.

While the Ritter reaction, hydrolysis, and sulfonation all proceed very readily with good yields being obtained from each step of the synthesis, it has been observed that the sulfonation step may be and frequently is troublesome because of the formation of resinous or polymeric products in the reaction medium. Ordinarily, the neutralization and sulfonation of the intermediate branched chain N-alkylacrylamide is conducted without isolation of the Ritter reaction product or the hydrolysis product, that is, the branched chain N-alkylacrylamides. It will be thus seen that there may be present in the reaction medium substances or materials which may readily form such resinous or polymeric substances including, for example, unreacted α-unsaturated nitrile and derivatives, olefin and N-alkylacrylamide. Many are readily polymerized through a free radical initiated mechanism. The generation of free radicals in the reaction mixture is easily possible since several substances are known to form free radical systems and are known to be present during the neutralization and sulfonation. Thus, such free radical initiating systems such as oxygen-bisulfite, iron-bisulfite, etc. may be seen to be present.

Attemps to minimize or to inhibit polymerization completely by excluding such substances as would combine to form free radical initiating systems may not be wholly successful particularly on a commercial or plant scale. Thus, oxygen may not be completely excluded from the reaction vessel unless blanketing of the contents of the vessel is resorted to. This, however, not only increases the processing time but also requires special chemical processing equipment. Nor can iron be wholly excluded from the reaction medium since trace amounts of the metal sufficient to initiate the radical formation with bisulfite still are present in the reaction medium because of the metal being used in storage vessels for the reactants, pipelines, valves, and even in the reaction vessel itself. It has been suggested that reaction conditions be more closely controlled so as to provide for removal of oxygen and adjustment of the pH of the reaction medium at or near the neutral point and preferably on the alkaline side. However, even adopting such processing modifications, insoluble polymer is still formed.

Accordingly, it is an object of this invention to provide branched chain alkali metal sulfo-N-alkylpropionamides which are characterized by excellent surface active properties.

It is a further object of the present invention to provide a process for preparing branched chain alkali metal sulfo-N-alkylpropionamides which employs readily available raw materials in a procedure which is economical and easy to control.

It is a still further object of the present invention to provide a process for preparing branched chain alkali metal sulfo-N-alkylpropionamides in which polymer formation is minimized or suppressed during the neutralization and sulfonation of the intermediate, i.e., branched chain N-alkylacrylamide obtained from the Ritter reaction of a suitable α-unsaturated olefin and an α-unsaturated nitrile in the presence of a cationoid substance.

These and other objects and advantages of the present invention will become more apparent from the detailed description thereof set forth hereinbelow.

In accordance with the present invention, a process is provided which comprises causing a branched chain N-alkylacrylamide Ritter reaction product (wherein the alkyl group, prior to the Ritter reaction, is predominantly straight chain and is characterized by having at least 6 carbon atoms) to react with an alkali metal sulfite or bisulfite in the presence of a polymerization inhibitor, said reaction being carried out at temperatures from about 20° C. to about 100° C. so as to obtain branched chain alkali metal sulfo-N-alkylpropionamides.

It has been discovered that the presence of a polymerization inhibitor is essential in order to avoid the formation of resinous or polymeric substances. Surprisingly, it has been found that N,N-di-tertiary-butyl nitroxide is particularly effective in eliminating or reducing the amount of polymer formed.

It has been discovered that if a small amount, that is, a polymerization inhibiting amount, of N,N-di-tertiary-butyl nitroxide is incorporated or dissolved in the neutralization and sulfonation reaction medium, little or no polymer is formed in the reaction vessel.

While the proposal to add a stabilizer or a polymerization inhibitor to various systems in which compounds capable of polymerizing are present in order to prevent, retard, or forestall polymerization is admitted to be known, it was and is nevertheless surprising to find that N,N-di-tertiary-butyl nitroxide used in the process of this invention performs in such an unexpected and surprising manner.

Numerous so-called inhibitors which have been used in the past have been found to be unsatisfactory for one or more of various reasons. Several, for example, failed to prevent or inhibit polymerization to an appreciable degree. Others failed to prevent polymerization within the reaction medium over a sufficiently long period of time. Still others were deficient in that an excessively large amount was required in order to obtain the required degree of polymerization inhibition. Finally, others imparted an objectionable dark color to the branched chain alkali metal sulfo-N-alkylpropionamides. By contrast, the polymerization inhibitor used in the process of this invention is unique in its inhibiting action particularly since the polymerizable components within the reaction medium are not capable of precise definition because of the presence of isomers therein. By carrying out the process of this invention in the presence of N,N-di-tertiary-butyl nitroxide, a remarkably clear solution of branched chain alkali metal sulfo-N-alkylpropionamides is obtained and further clarification treatment which would ordinarily be required if polymer is formed during neutralization and sulfonation is unnecessary. Moreover, the solution of final product shows no discernible increase in color, thus indicating an especially desirable advantage.

N,N-di-tertiary-butyl nitroxide (B.P. 74–75° C., 35 mm.) is a red liquid, moderately volatile in an oxygen or nitrogen stream at room temperature and is stable to oxygen, water, and aqueous alkali. It is readily prepared from the reaction of a nitro alkane or nitroso alkane with an alkali metal followed by hydrolysis of the intermediate reaction product, which method is described and claimed in copending application Ser. No. 129,560, filed Aug. 7, 1961, now Patent No. 3,163,677, by Arthur Kentaro Hoffmann and Audrey Tesch Henderson. Reference may also be made to a publication by the applicants just mentioned appearing in the Journal of the American Chemical Society, vol. 83, pages 4671–4672 (1961).

The process of this invention comprises reacting a branched chain N-alkylacrylamide with an alkali metal sulfite or bisulfite while maintaining the pH of the reaction medium at least above about 7 and preferably above 8. The pH during sulfonation may thus be maintained within the range of about 7 to 11, and more preferably, within the range of 8 to 10.

The branched chain N-alkylacrylamides employed in the process are preferably the reaction products resulting from the reaction of an olefin or mixtures of olefins having at least 6 carbon atoms and an α-unsaturated nitrile in the presence of a cationoid substance such as strong sulfuric acid.

The olefins employed in the preparation of the branched chain N-alkylacrylamides in accordance with this invention are olefins characterized by having at least 6 carbon atoms and up to 40 carbon atoms, and preferably from between 10 and about 20 carbon atoms. Preferably, they are predominantly straight chain. When the sulfonated N-alkylacrylamide end product is to be employed as a detergent, it is preferred that the olefin be a long chain material having at least 10 carbon atoms. Such olefins and mixtures thereof are available from the petroleum industry. As examples of suitable olefins, the following are illustrative: decene-1, decene-2, decene-3, decene-4, decene-5, undecene-1, undecene-2, undecene-3, undecene-4, undecene-5, dodecene-1, dodecene-2, dodecene-3, dodecene-4, dodecene-5, dodecene-6, tridecene-1, tridecene-2, tridecene-3, tridecene-4, tridecene-5, tridecene-6, tetradecene-1, tetradecene-2, tetradecene-3, tetradecene-4, tetradecene-5, tetradecene-6, tetradecene-7, pentadecene-1, pentadecene-2, pentadecene-3, pentadecene-4, pentadecene-5, pentadecene-6, pentadecene-7, hexadecene-1, hexadecene-2, hexadecene-3, hexadecene-4, hexadecene-5, hexadecene-6, hexadecene-7, hexadecene-8, octadecene-1, octadecene-2, octadecene-3, octadecene-4, octadecene-5, octadecene-6, octadecene-7, octadecene-8, octadecene-9, telomers of isopropylene and isobutylene such as propylene tetramer, propylene hexamer, triisobutylene, tetraisobutylene, and mixtures of two or more of such olefins or their equivalents.

The α-unsaturated nitrile should be a material which when condensed with the olefin is capable of bisulfite addition at its unsaturated double bond. Principally such nitriles include acrylonitrile, α-substituted acrylonitriles, such as methacrylonitrile, α-chloroacrylonitrile, and β-substituted acrylonitriles such as crotononitrile, β-chloroacrylonitrile and other equivalent materials.

The reaction between the long chain olefin and the nitrile is carried out in the presence of a cationoid substance capable of fully protonizing the double bond of the olefin. Thus, any material capable of this function in the reaction whereby the intermediate secondary or tertiary N-alkylacrylamides are prepared is contemplated. However, as a practical matter, such a cationoid substance is limited to a strong sulfuric acid, by which term is meant sulfuric acid having a concentration of 90% and greater and usually a concentration of from between 95 and 100%.

The reaction between the long chain olefin and an α-unsaturated nitrile in the presence of strong sulfuric acid, which reaction product is sulfonated in accordance with this invention, may be carried out in accordance with the procedure of U.S. Patent No. 2,573,673. In such a procedure relative mole ratios of approximately 1:1:1 olefin to nitrile to acid are reacted at suitable temperatures to form reaction products containing secondary N-alkylacrylamides.

If desired, excess nitrile may be employed, though in general no particular advantage is obtained thereby. Preferably, the strong sulfuric acid is added to a mixture of the nitrile and the olefin while said mixture is being maintained at a temperature of less than 90° C. and preferably from between 20° to 80° C. After the addition of acid, the reaction mixture is maintained at a temperature of 40° to less than 90° C. whereby the intermediate Ritter reaction products are prepared.

Alkane sulfates which are formed need not be removed in accordance with the process aspects of this invention particularly when the branched chain alkali metal sulfo-N-alkylpropionamides are to be employed as detergent surface active agents, a function for which they are admirably suited.

When the reaction forming the intermediate Ritter reaction products is complete, which may be readily determined by empirical means, water is added to such products or the products are added to water to hydrolyze such products to the branched chain N-alkylacrylamides. The pH of the reaction mixture is then adjusted from a value of less than 2 and usually about 1, to a value above 7 and very preferably above 8 with a suitable base, for example, an alkali metal or alkaline earth metal hydroxide. The polymerization inhibitor, N,N-di-tertiary-butyl nitroxide, may be introduced prior to or simultaneously with the added base. Alternatively, the polymerization inhibitor may be introduced to the reaction vessel during the sulfonation. After adjusting the pH of the hydrolysis mixture to a pH above 8, an excess of an alkali metal sulfite or bisulfite as, for example, sodium, potassium, lithium or ammonium sulfite or metabisulfite, is added. After the sulfite or bisulfite addition, further adjustment of the pH with base may be required in order to insure that the pH of the reaction mixture is maintained above about 7 and preferably above 8. A solvent may be and preferably is also added to the sulfonation reaction medium. In the case of branched chain N-alkylacrylamides prepared from $C_{20}$ or less olefins, a suitable alcohol as, for example, methanol, ethanol, n-propyl alcohol, isopropyl alcohol or solvents of similar polarity may be added. When the branched chain N-alkylacrylamides are obtained from $C_{20}$ or higher olefins, suitable hydrocarbon solvents such as Stoddard solvent, Varsol, or the like may be used. Such solvents provide homogeneity in the reaction medium either as a solution or as an emulsion. The reaction mixture is then normally heated at a temperature of from about 50° to about 100° C. and preferably at a temperature of from about 60° C. to 90° C. Generally, the reaction is carried out under reflux. The time of sulfonation, in general, varies with the temperature and thus sulfonation under reflux may be carried out over periods of from about 1 to about 5 hours. The solvent is subsequently stripped off from the sulfonation reaction medium and a resulting clear solution of alkali metal sulfo-N-alkylpropionamide is obtained. The solution may be used as such or may be spray-dried or the alkali metal sulfo-N-alkylpropionamide may be isolated by suitable conventional procedures.

The presence of minor amounts (less than 50% by weight of the N-alkylacrylamide reaction product) as, for example, at least 0.5% and preferably not more than 20%, of alkane sulfates obtained during the Ritter reaction appears to improve the efficiency of the sulfonation step. Thus, it has been determined that such sulfates serve as emulsifying agents for the N-alkylacrylamides thus insuring finer particle size and thus greater contact with the alkali metal sulfite or bisulfite sulfonating agent. The alkali metal sulfite or bisulfite is normally added in an amount to insure complete sulfonation of the N-alkylacrylamide. Ordinarily, an equivalent of the sulfite or bisulfite is sufficient although slight excesses up to about 15% may be employed. Greater excesses are deemed to be unnecessary and undesirable due to the difficulty in destroying the excess sulfite or bisulfite.

The reactions are preferably carried out at atmospheric pressure although subatmospheric or superatmospheric pressures are not precluded.

The concentration of N,N-di-tertiary-butyl nitroxide may vary within wide limits, for example, between about 0.0001 and about 2.0% or more based on the weight of the N-alkylacrylamides present. The recommended range is between about 0.01 and 0.2%. At any rate, large amounts of polymerization inhibitor are undesirable because of its cost. It is further generally desirable to purge the neutralization and sulfonation vessels with nitrogen thereby to decrease the amount of polymerization inhibitor which may be necessary to add to the vessels.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

*Examples*

(A) Acrylonitrile (10 moles), $C_{11}$–$C_{15}$ α-olefins (10 moles) are mixed and heated to 50° C. Sulfuric acid, 95.7% (11 moles) is added to the acrylonitrile-olefin mixture over a four hour period. Following the addition of acid, the product is aged for one hour at 50° C. and then cooled to room temperature.

(B) A portion of the product of Example A amounting to 173 parts and equivalent to 0.5 mole of acrylonitrile charged is added to a mixture containing 330 parts of water, 44 parts of 50% sodium hydroxide (0.55 mole, real), 56.5 parts sodium sulfite (0.45 mole) and 40 parts isopropanol. The reaction mixture is heated to the reflux temperature of isopropanol, approximately 85–90° C., and heating is continued for form 1 to 5 hours until aliquot samples indicate maximum disappearance of sulfite ion.

The mixture when spray dried yielded a light cream colored powder containing 50–55% sodium sulfo-N-alkyl-($C_{11}$–$C_{15}$)-propionamide, 42% sodium sulfate, balance sodium alkyl sulfate and other minor components.

(C) The procedure of Example B is repeated in all essential respects except that the reaction vessels are purged with nitrogen.

(D) The procedure of Example B is repeated in all essential respects except that methyl ether hydroquinone, 0.17 part (0.1% of the acid product, i.e., the Ritter product, used in the example) is added to the sulfonation mixture prior to the admission of the product from Example A.

(E) The procedure of Example C is repeated in all essential respects except that 0.17 part of di-t-butyl catechol is added to the sulfonation mixture as in Example D.

(F) The procedure of Example D is repeated in all essential respects except that di-t-butyl-p-cresol is employed in place of methyl ether hydroquinone.

(G) The procedure of Example C is repeated in all essential respects except that hydroquinone is employed in place of methyl ether hydroquinone.

(H) The procedure of Example C is repeated in all essential respects except that cupferron is employed in place of methyl ether hydroquinone.

(I) The procedure of Example C is repeated in all essential respects and N,N-di-tertiary-butyl nitroxide, 0.033 part (0.019% of the acid product, i.e., the Ritter product) is added to the sulfonation mixture prior to the admission of the product from Example A.

(J) The procedure of Example I is repeated in all essential respects except that the reaction vessels are not purged with nitrogen.

(K) The procedure of Example J is repeated in all essential respects except that 0.030 part (0.017% of the acid product, i.e., the Ritter product) of N,N-di-tertiary-butyl nitroxide is employed.

(L) The procedure of Example I is repeated in all essential respects except that 0.030 part (0.017% of the acid product, i.e., the Ritter product) of N,N-di-tertiary-butyl nitroxide is employed.

(M) The procedure of Example I is repeated in all essential respects except that 0.015 part (0.008% of the acid product, i.e., the Ritter product) of N,N-di-tertiary-butyl nitroxide is employed.

(N) The procedure of Example J is repeated in all essential respects except that 0.007 part (0.004% of the acid product, i.e., the Ritter product) of N,N-di-tertiary-butyl nitroxide is employed.

The results of Examples B to N are tabulated below:

TABLE

| Example | Inhibitor | Amount of "Inhibition" | | | | Nitrogen Purge | Polymer in Product |
|---|---|---|---|---|---|---|---|
| | | Parts | As percent of— | | | | |
| | | | Acid Product | Final Product | N-alkyl-acrylamide | | |
| B | None | | | | | No | Yes. |
| C | do | | | | | Yes | Yes. |
| D | Methyl ether hydroquinone | 0.17 | 0.1 | 0.027 | 0.14 | No | Yes. |
| E | Di-tert-butylcatechol | 0.17 | 0.1 | 0.027 | 0.14 | Yes | Yes. |
| F | Di-tert-butyl-p-cresol | 0.17 | 0.1 | 0.027 | 0.14 | No | Yes. |
| G | Hydroquinone | 0.17 | 0.1 | 0.027 | 0.14 | Yes | Small amount. Deep brown colored solution. |
| H | Cupferron | 0.17 | 0.1 | 0.027 | 0.14 | Yes | Do. |
| I | N,N-di-tert-butyl nitroxide | 0.033 | 0.019 | 0.006 | 0.033 | Yes | No. Sparkling clear solution. |
| J | do | 0.033 | 0.019 | 0.006 | 0.033 | No | Do. |
| K | do | 0.030 | 0.017 | 0.005 | 0.029 | No | Do. |
| L | do | 0.030 | 0.017 | 0.005 | 0.029 | Yes | Do. |
| M | do | 0.015 | 0.008 | 0.0025 | 0.015 | Yes | Do. |
| N | do | 0.007 | 0.004 | 0.0013 | 0.007 | No | Do. |

From the results appearing hereinabove, it will be seen that N,N-di-tertiary-butyl nitroxide is particularly and unusually effective in affording an alkali metal sulfo-N-alkylpropionamide product which is free from polymer. Such unexpected findings are evident from a visual inspection of the solution of the product. The data presented in the table also indicate that certain other well known polymerization inhibitors failed to minimize or to alleviate the formation of polymer. Moreover, it will be noted that the amount of N,N-di-tertiary-butyl nitroxide may be varied over a wide range and inhibition of polymerization is still realized.

While the foregoing invention has been described in conjunction with various preferred embodiments, it is to be understood that the invention is not solely limited thereto but is to be construed broadly and restricted only by the following appended claims.

I claim:

1. In a process for preparing an alkali metal sulfo-N-alkylpropionamide by reacting an N-alkyl-acrylamide, wherein the alkyl group contains at least six carbon atoms, with a compound selected from the group consisting of alkali metal sulfites and bisulfites, the improvement which comprises carrying out said reaction in the presence of a polymerization inhibiting amount of N,N-di-tertiary-butyl nitroxide.

2. A process as in claim 1 in which the alkyl group of said N-alkylacrylamide contains at least 10 carbon atoms.

3. A process as in claim 1 in which N,N-di-tertiary-butyl nirtoxide is present in an amount from about 0.0001 to about 2.0%, by weight, based upon the amount of N-alkylacrylamide.

4. A process as in claim 1 carried out at temperatures of from about 20° C. to about 100° C.

References Cited

UNITED STATES PATENTS

| | | | |
|---|---|---|---|
| 3,170,951 | 2/1965 | Sheers et al. | 260—513 |
| 3,253,015 | 5/1966 | Hoffman | 260—583 |

LORRAINE A. WEINBERGER, *Primary Examiner.*

M. WEBSTER, *Assistant Examiner.*